United States Patent Office 3,641,119
Patented Feb. 8, 1972

3,641,119
PROCESS OF PREPARING CHLOROMETHYL ESTERS OF α,β-UNSATURATED CARBOXYLIC ACIDS
Gerhard Ballé, Cologne-Flittard, and Günter Kolb, Cologne-Stammheim, Germany, assignors to Farbenfabriken Bayer Aktiengesellschaft, Leverkusen, Germany
No Drawing. Filed Jan. 26, 1970, Ser. No. 5,890
Claims priority, application Germany, Feb. 28, 1969,
P 19 10 105.4
Int. Cl. C07c 69/54
U.S. Cl. 260—486 H                1 Claim

ABSTRACT OF THE DISCLOSURE

Chloromethyl esters of α,β-unsaturated carboxylic acids are produced by reacting α,β-unsaturated carboxylic acid chloride with formaldehyde or with a formaldehyde donor in the presence of a catalytic quantity of ferric chloride or stannic chloride.

---

This invention related to a novel process for the production of chloromethyl esters of α,β-unsaturated carboxylic acids containing from 3 to 5 carbon atoms.

It is known that the chloromethyl esters of α,β-unsaturated carboxylic acids can be obtained from α,β-unsaturated carboxylic acid chlorides and formaldehyde in the presence of zinc chloride as catalyst. Unfortunately, this process gives very poor yields of end product so that it cannot be used economically to produce compounds of this kind on a commercial scale (cf. Journal of General Chemistry, USSR, English translation, 28, 1958, pages 1971–1976, A. Ia, Iakubovich et al. "Syntheses of Vinyl Monomers").

The present invention relates to a process which gives high yields of chloromethyl esters of α,β-unsaturated carboylic acids in a smooth reaction, by virtue of the fact that special catalysts are used for the reaction of the α,β-unsaturated carboxylic acid chlorides with formaldehyde.

Accordingly, the invention relates to a process for the production of chloromethyl esters of α,β-unsaturated carboxylic acids containing from 3 to 5 carbon atoms, wherein an α,β-unsaturated carboxylic acid chloride containing from 3 to 5 carbon atoms is reacted with formaldehyde or with a formaldehyde donor in the presence of a catalytic quantity of ferric chloride or stannic chloride.

It was extremely surprising that ferric chloride and stannic chloride could be used as extremely effective catalysts for the reaction of α,β-unsaturated carboxylic acid chlorides with formaldehyde, so that the chloromethyl esters are formed quickly in high yields. Most Lewis acids and mineral acids have little or no catalytic activity, lead to undesired products, or catalyse polymerisation of the formaldehyde into products of high molecular weight which no longer react with acid chlorides.

α,β-Unsaturated carboxylic acid chlorides which can be used according to the present context include those containing from 3 to 5 carbon atoms. The following are mentioned by way of example: acrylic acid chloride, methacrylic acid chloride, crotonic acid chloride, fumaric acid chloride, itconic acid chloride, and others.

The formaldehyde which is reacted with the α,β-unsaturated carboxylic acid chlorides is used in substantially anhydrous form, for example as gaseous formaldehyde or in the form of formaldehyde donors, for example in the form of reactive aligomers and polymers, such as 1,3,5-trioxane or paraformaldehyde. Small quantities of moisture have hardly any effect on the reaction. Paraformaldehyde is preferably used because of its reactivity.

Although there are no limits to the quantitative ratio of formaldehyde to carboxylic acid chloride, at least an equimolecular quantity of formaldehyde, and preferably a slight excess (up to 20 mol percent), is used to obtain the highest possible conversion.

Ferric chloride and stannic chloride are used as catalysts, conveniently in quantities of from 0.01 to 10% by weight, and preferably in quantities of from 0.5 to 5% by weight, based on unsaturated carboxylic acid chlorides.

The reaction between the α,β-unsaturated carboxylic acid chlorides and formaldehyde in the presence of the catalysts used according to the invention can be carried out in bulk or in the presence of solvents or diluents whose boiling points enable them to be separated from the distillation product by distillation, such as inert organic solvents, for example aliphatic and aromatic hydrocarbons such as hexane, cyclohexane or toluene; chlorobenzene; halogenated aliphatic hydrocarbons, such as methylene chloride, chloroform or carbon tetrachloride; dialkyl ethers such as diethyl ether; dioxane; or esters, such as ethyl acetate and butyl acetate. In many instances, however, the reaction may be carried out in the absence of solvents, providing appropriate measures are taken, in the form of cooling or introducing the formaldehyde either continuously or in portions, to ensure that the exothermic reaction is controlled.

Although the reaction proceeds at sufficient velocity at temperatures as low as room temperature, it can also be carried out at higher temperatures. It is best to maintain a reaction temperature of from 40 to 80° C.

It is advisable to add a polymerisation inhibitor, for example phenothiazine or hydroquinone, to the reaction mixture.

After all of the formaldehyde or formaldehyde donor, for example paraformaldehyde, has been dissolved in the reaction mixture, the reaction mixture can be worked up, which is best done by fractional distillation. As a rule, the catalysts do not have to be removed before distillation. If the readily volatile stannic chloride cannot be separated from the product by distillation, it is advisable to convert it into an insoluble derivative which can be separated off before distillation. A suitable derivative for this purpose is its addition compound with two molecules of pyridine, which is insoluble in organic solvents and in the chloromethyl esters of the α,β-unsaturated carboxylic acids.

The α,β-unsaturated carboxylic acid chloromethyl esters are polymerisable monomers and comprise valuable intermediates for the production of other polymerisable monomers, plant protection agents and pharmaceutical preparations. Since the chloromethyl etser group is a highly reactive group, it is able to take part in numerous reactions even when it is attached to polymeric chains. It reacts with alcohols or mercaptans with replacement of the chlorine by the alkoxy or alkylmercapto radical. Reaction with primary or secondary amines yields carboxylic acid amide groups and tertiary amines are added to form quaternary ammonium groups. Reaction with alkali metal sulphides or alkali metal sulphites gives polymeric mercaptomethyl or sulphomethyl esters. The mercaptomethyl esters can be used as ion exchanges and as redox exchangers, whilst the sulphomethyl esters are antistatically active. Chloromethyl esters and their polymers, and the quaternary ammonium salts derived from them, can be employed as photographically inert gelatine hardeners.

In addition, they may be directly used (in the presence of alkali) as formaldehyde donors.

EXAMPLE 1

Methacrylic acid chloromethyl ester

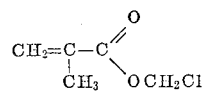

10 g. of sublimed ferric chloride and 1 g. of phenothiazine are dissolved in 1050 g. of methacrylic acid chloride, followed by the addition, while stirring and cooling with ice, of 300 g. of paraformaldehyde in three to four portions, the interval between each addition being of sufficient duration to allow the solution to become homogeneous. The solution is then stirred for one hour at 60° C. and the product is distilled in the vacuum of an aspirator pump into an ice-cooled receiver which is changed when the distillation temperature exceeds 60° C./20 mm. Hg. The distillate is stabilised with 1 g. of phenothiazine and fractionated through an effective column. Yield 75 to 80% of the theoretical of methacrylic acid chloromethyl ester, B.P. 52–53° C.20 /mm. Hg.

EXAMPLE 2

Acrylic acid chloromethyl ester

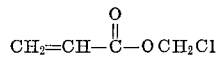

The procedure is as in Example 1, except that acrylic acid chloride is used instead of methacrylic acid chloride. The acrylic acid chloromethyl ester is obtained in a yield of 65 to 70% of theoretical, B.P. 32–34° C./14 mm. Hg.

EXAMPLE 3

Crotonic acid chloromethyl ester

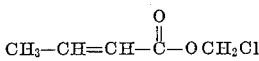

210 g. of crotonic acid chloride are reacted, as in Example 1, with 60 g. of paraformaldehyde in the presence of 3 g. of stannic chloride. The yield of crotonic acid chloromethyl ester comprises 70 to 75% by weight of the theoretical, B.P. 55–57° C./10 mm.

The same results are obtained by introducing gaseous formaldehyde into the reaction mixture rather than paraformaldehyde.

What is claimed is:

1. A process for the production of chloromethyl esters of α,β-unsaturated carboxylic acids containing from 3 to 5 carbon atoms, wherein α,β-unsaturated carboxylic acid chloride containing from 3 to 5 carbon atoms is reacted with formaldehyde or with a formaldehyde donor in the presence of a catalytic quantity of ferric chloride or stannic chloride.

References Cited

UNITED STATES PATENTS 3,418,301   12/1968   Spivey _____ 260—486 H

FOREIGN PATENTS 714,579   7/1965   Canada _____ 260—486 H

JAMES A. PATTEN, Primary Examiner

P. J. KILLOS, Assistant Examiner

U.S. Cl. X.R.

96—119 R, 106—316; 252—184; 260—485 H